（12）United States Patent
Lim et al.

(10) Patent No.: US 11,226,498 B2
(45) Date of Patent: Jan. 18, 2022

(54) EYEGLASSES HAVING SELECTIVELY DETACHABLE PATTERN LAYER

(71) Applicants: Seong Kyu Lim, Daegu (KR); Myeong Hee Kim, Daegu (KR); Jong Ho Lim, Daegu (KR); Jong Yun Lim, Daegu (KR)

(72) Inventors: Seong Kyu Lim, Daegu (KR); Myeong Hee Kim, Daegu (KR); Jong Ho Lim, Daegu (KR); Jong Yun Lim, Daegu (KR)

( * ) Notice: Subject to any disclaimer, the term of this patent is extended or adjusted under 35 U.S.C. 154(b) by 208 days.

(21) Appl. No.: 16/622,888

(22) PCT Filed: Jun. 15, 2018

(86) PCT No.: PCT/KR2018/006804
§ 371 (c)(1),
(2) Date: Dec. 13, 2019

(87) PCT Pub. No.: WO2018/231019
PCT Pub. Date: Dec. 20, 2018

(65) Prior Publication Data
US 2020/0209651 A1 Jul. 2, 2020

(51) Int. Cl.
G02C 11/02 (2006.01)
G02C 7/08 (2006.01)
G02C 9/04 (2006.01)

(52) U.S. Cl.
CPC .............. *G02C 11/02* (2013.01); *G02C 7/086* (2013.01); *G02C 9/04* (2013.01)

(58) Field of Classification Search
CPC .......... G02C 11/02; G02C 7/086; G02C 9/04; G02C 2200/02; G02C 7/08

USPC ........................................................ 351/41, 57
See application file for complete search history.

(56) References Cited

U.S. PATENT DOCUMENTS

| 8,020,987 B2* | 9/2011 | Lin ......................... G02C 7/10 351/44 |
| 8,678,581 B2* | 3/2014 | Blum ....................... G02C 9/00 351/158 |
| 10,488,676 B2* | 11/2019 | Zewe ................... G02C 13/003 |

FOREIGN PATENT DOCUMENTS

| JP | 3042680 U | 10/1997 |
| JP | 4670416 B2 | 4/2011 |
| KR | 20-0322764 Y1 | 8/2003 |
| KR | 10-2004-0073509 A | 8/2004 |
| KR | 10-2007-0040669 A | 4/2007 |
| KR | 10-2011-0085017 A | 7/2011 |

(Continued)

OTHER PUBLICATIONS

International Search Report dated Oct. 15, 2018 for corresponding international application No. PCT/KR2018/006804.

*Primary Examiner* — Tuyen Tra
(74) *Attorney, Agent, or Firm* — Hauptman Ham, LLP

(57) ABSTRACT

The present invention relates to eyeglasses having a selectively detachable pattern layer, and relates to a technology wherein one or more pattern layers having variously shaped images are attached on a surface of a main lens or an auxiliary lens to satisfy wearers' needs and provide convenience for wearers, allow wearer to show off his or her own individuality or expression, and induce curiosity and interest of a viewer, and a support is provided to reduce friction between the main lens or the auxiliary lens and the pattern layer.

5 Claims, 14 Drawing Sheets

(56) References Cited

FOREIGN PATENT DOCUMENTS

| | | | |
|---|---|---|---|
| KR | 10-2013-0088627 A | 8/2013 | |
| KR | 10-1344689 B1 | 12/2013 | |

* cited by examiner

EYEGLASSES HAVING SELECTIVELY DETACHABLE PATTERN LAYER

CROSS-REFERENCE TO RELATED APPLICATION

The present application is a national stage filing under 35 U.S.C § 371 of PCT application number PCT/KR2018/006804 filed on Jun. 15, 2018 which is based upon and claims the benefit of priorities to Korean Patent Application No. 10-2017-0076910, filed on Jun. 16, 2017 and Korean Patent Application No. 10-2017-0145529, filed on Nov. 2, 2017, in the Korean Intellectual Property Office, which are incorporated herein in their entireties by reference.

TECHNICAL FIELD

The present invention relates to eyeglasses having a selectively detachable pattern layer, and more particularly, to a technology wherein one or more pattern layers having variously images are attached on the surface of a main lens or an auxiliary lens to satisfy wearers' needs and provide convenience for wearers, allow wearer to show off his or her own individuality or expression, arouse viewers' curiosity and interest, and restrain friction among the main lens, the auxiliary lens and the pattern layer by having a support.

BACKGROUND ART

In general, many people wear eyeglasses for various purposes. Some people wear eyeglasses for sight correction, such as correction of ametropia, correction of orthophoric abnormality, correction of a control function, and correction of presbyopia, and some people wear for sight protection to protect eyes from harmful rays. Moreover, some people wear eyeglasses for the purpose of orthoptics of amblyopia or for purposes of beauty treatment or fashion or for leports, such as firing or climbing.

Such eyeglasses worn for various purposes have been gradually lightened and individuated with the advent of advanced materials, and provide decorative beauty. If a person who is wearing eyeglasses for sight correction meets presbyopia, he or she has to prepare various auxiliary eyeglasses suitable for the state of being confronted or for objects to be seen and wear or additionally attach the auxiliary eyeglasses proper to situations. Furthermore, if a person who is wearing eyeglasses for sight correction drives a car, the person sometimes must wear the eyeglasses for sight correction and the eyeglasses for sight protection at the same time, so the eyeglasses become heavier due to the attached eyeglasses even though they should be light weight.

Meanwhile, in order to overcome the conventional problems, recently, technologies to selectively attach and detach an auxiliary eyeglass frame to and from a general eyeglass frame have been developed and there are lots of disclosures of prior references.

Such references are as follows.

Korean Patent Publication No. 10-2004-0073509 discloses eyeglasses having auxiliary eyeglasses and main eyeglasses, wherein the auxiliary eyeglasses joined to the main eyeglasses include magnetic materials with magnetism joined to a rear surface thereof and an auxiliary positioning support formed on a lens rim thereof.

Korean Patent No. 10-1344689 discloses eyeglasses with detachable auxiliary lenses including magnetically transparent films applied onto the front surfaces of main lenses of main eyeglasses and magnetically transparent films applied onto the rear surfaces of auxiliary lenses detachably attached to the main lenses, wherein the magnetically transparent films of the main lenses and the auxiliary lenses are cobalt-added titanium dioxide films and are formed at corresponding positions to each other while being put around exterior parts of the main lenses and the auxiliary lenses, and translucently dotted marks are formed at the positions of the magnetically transparent films of the main lenses and the auxiliary lenses so as for a user to easily arrange the auxiliary lenses when the auxiliary lenses are attached to the main lenses.

Japanese Patent Publication No. 2006-267162 discloses eyeglasses including main lenses mounted on a glass frame and auxiliary lenses joined to the main lenses, wherein the main lenses have at least two first magnetically attached portions buried in curved surfaces of the main lenses joined with the auxiliary lenses and the auxiliary lenses have at least two first magnetically attached portions buried at positions corresponding to the first magnetically attached portions in curved surfaces of the auxiliary lenses joined with the auxiliary lenses. That is, the eyeglasses are combination eyeglasses that the auxiliary lenses are detachably attached to the main lenses by magnetism between the first magnetically attached portions and the second magnetically attached portions. A fitting recessed part is mounted at the first magnetically attached portion and a fitting protruding part is mounted at the second magnetically attached portion to correspond to the fitting recessed part, wherein the fitting recessed part is caved in a normal line direction of a refracting interface of the main lens facing an object.

The references relate with technologies that the glass frame having the main lenses and the auxiliary glass frame having the auxiliary lenses or the main lenses and the auxiliary lenses mounted on the glass frame have magnetic forces so that they can be detachably attached to each other.

However, the references have a problem in that it is difficult to provide diversity since the simple attachment and detachment of the auxiliary glass frame or the auxiliary lenses are just used for sight correct and for the purpose of sunglasses.

Moreover, the references have another problem in that the main lenses or the auxiliary lenses are damaged due to friction therebetween when the auxiliary lenses are attached to the main lenses.

DISCLOSURE

Technical Problem

Accordingly, the present invention has been made in view of the above-mentioned problems occurring in the prior art, and it is an object of the present invention to provide eyeglasses having a selectively detachable pattern layer, which include auxiliary lenses detachably attached to main lenses mounted on a glass frame, magnetically transparent films and buried magnets formed on the entire surfaces or parts of the outer surfaces of the main lenses or the auxiliary lenses, and a pattern layer selectively attached to or detached from any one among the magnetically transparent films in order for a wearer to show convenience and individuality if necessary, thereby showing wearers' individuality and convenience by combining the pattern layer with one or more images, arousing viewers' curiosity and interest, allowing the wearer to immediately express himself or herself in various way according to the wearer's situations, and allowing the wearer to selectively use reading glasses if necessary since selectively providing the power (reading glasses) to the auxiliary lenses or the pattern layer to be formed smaller or larger than the main lenses.

Technical Solution

To accomplish the above object, according to the present invention, there is provided eyeglasses having a selectively detachable pattern layer including: main lenses (10) mounted on a glass frame (1); auxiliary lenses (20) attached to the main lenses (10); and magnetically transparent films (11, 21) or buried magnets formed on the corresponding surfaces of the main lenses (10) and the auxiliary lenses (20) so that the auxiliary lenses (20) are detachably attached to the main lenses (10), wherein the magnetically transparent film (11) or the buried magnet of each main lens (10) is entirely or partially formed on the main lens (10) and two or more magnetically transparent films (11) are formed on the rim of the front surface of the main lens to be spaced apart from each other when the magnetically transparent film (11) is formed partially, and wherein the auxiliary lens (20) includes: a magnetically transparent film (21) formed to correspond to the magnetically transparent film (11); a magnetically transparent film (23) entirely or partially formed on the other surface of the auxiliary lens (20) on which the magnetically transparent film (21) is coated so that the magnetically transparent films generally have various colors and are formed smaller or larger than the auxiliary lens (20); a magnetically transparent film (27) formed on the whole surface of one side thereof; and a pattern layer (25) selectively attached to or detached from the magnetically transparent film (11) or the magnetically transparent film (23).

Advantageous Effects

As described above, the eyeglasses having a selectively detachable pattern layer according to an embodiment of the present invention can wearers to selectively attach and detach the pattern layers with various forms to and from the outer surfaces of the main lenses or auxiliary lenses according to the current situations so that the wearers can show their own expressions and individualities and quickly cope with their situations, thereby providing convenience and diversity in use and causing curiosity and interest of viewers. In the case that the wearer attaches the pattern layers or the auxiliary lenses having the power of eyeglass to the main lenses, when the wearer goes down the stairs or the eye focus of the wearer looks down, the wearer can detach the auxiliary lenses and the pattern layers from the main lenses to prevent shaky eyes and secure stability.

Additionally, the eyeglasses having a selectively detachable pattern layer according to the embodiment of the present invention can prevent a damage of the main lenses or the auxiliary lenses since the corresponding portions of the main lenses and the auxiliary lenses do not touch each other when the auxiliary lenses and the pattern layers are attached to the main lenses.

Figure 1:
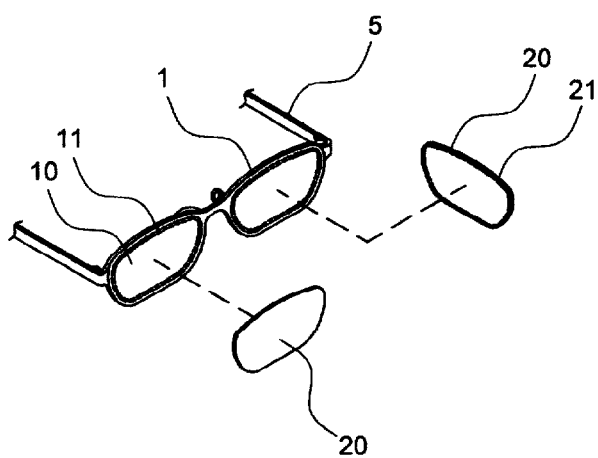
FIG. 1 is a perspective view showing states where main lenses and auxiliary lenses are attached and detached according to a conventional art.
Figure 1:
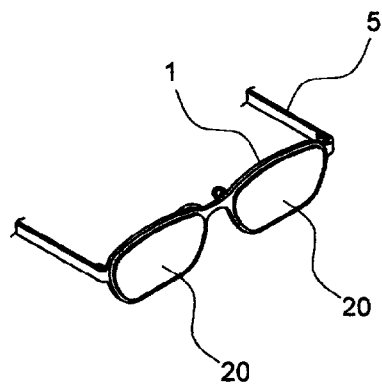

1: glass frame 5: temple 10: main lens
11: magnetically transparent film 16: groove
20: auxiliary lens 21: magnetically transparent film
2: pattern layer 26: groove
27: magnetically transparent film 30: support

MODE FOR INVENTION

As shown in FIG. 1, the technology that main lenses and auxiliary lenses are attached and detached using magnetism generally includes a glass frame 1 and temples 5, main lenses 10 inserted into the glass frame 1, and auxiliary lenses 20 selectively attached to and detached from the front surfaces of the main lenses 10, wherein the main lenses 10 and the auxiliary lenses 20 include magnetically transparent films 11 and 21 coated at corresponding edge portions thereof or magnets buried in the corresponding edge portions so that the main lenses and the auxiliary lenses are attached to each other. However, because such auxiliary lenses 20 are made of a transparent material or used as lenses for sunglasses, it is difficult for the auxiliary lenses 20 to be used for other than the above-mentioned purpose.

The present invention provides a technology that one or more pattern layers with various images are attached onto surfaces of the main lenses or the auxiliary lenses so as to allow wearers to show their own individualities and expressions and to arouse viewers' curiosity and interest, and restrain friction among the main lenses, the auxiliary lenses and the pattern layers.

Hereinafter, referring to FIGS. 2 to 14, preferred structure and action of the present invention to achieve the above-mentioned objects will be described in detail with reference to the accompanying drawings.

First, referring to FIGS. 2 to 4, the structure of the present invention will be described. The eyeglasses according to the present invention includes main lenses 10 mounted on a glass frame 1, auxiliary lenses 20 attached to the main lenses 10, and magnetically transparent films 11 and 21 formed on the corresponding surfaces of the main lenses 10 and the auxiliary lenses 20 so that the auxiliary lenses 20 are detachably attached to the main lenses 10, wherein the magnetically transparent film 11 is entirely or partially formed on the main lens 10 and two or more magnetically transparent films 11 are formed on the rim of the front surface of the main lens to be spaced apart from each other when the magnetically transparent film 11 is formed partially, and wherein the auxiliary lens 20 includes: a magnetically transparent film 21 formed to correspond to the magnetically transparent film 11; a magnetically transparent film 23 entirely or partially formed on the other surface of the auxiliary lens 20 on which the magnetically transparent film 21 is coated so that the magnetically transparent films generally have various colors and are formed smaller or larger than the main lens 10 or the auxiliary lens 20; a magnetically transparent film 27 formed on the whole surface of one side thereof; and a pattern layer 25 selectively attached to or detached from the magnetically transparent film 11 or the magnetically transparent film 23.

Figure 2:
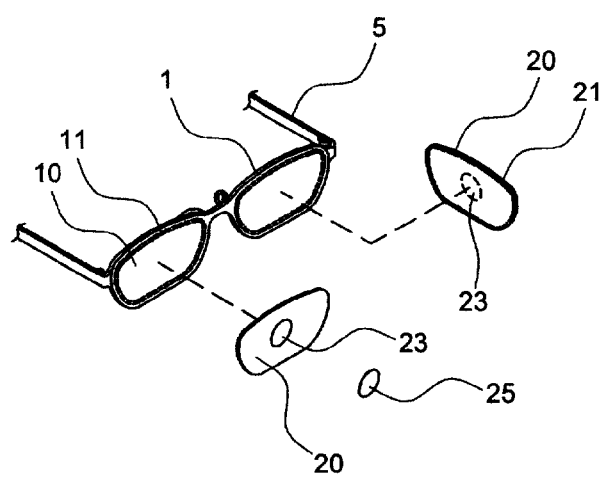
FIG. 2 is a perspective view showing eyeglasses according to a preferred embodiment of the present invention.
Figure 2:
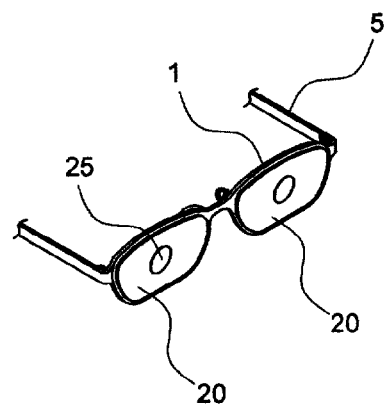

As shown in FIG. 2, the eyeglasses generally include the glass frame 1, the temples 5, the main lenses 10 fit into the glass frame 1, and auxiliary lenses 20 selectively attached to and detached from the front surfaces of the main lenses.

The magnetically transparent films 11 and 21 are formed entirely or partially at the edges of the corresponding portions so that the auxiliary lenses 20 can be selective attached and detached.

Figure 4:
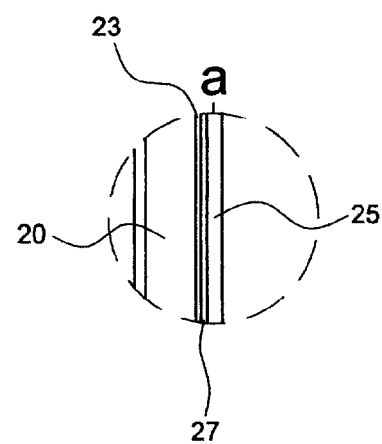
FIG. 4 is a view showing the eyeglasses according to the preferred embodiment of the present invention.
Figure 4:
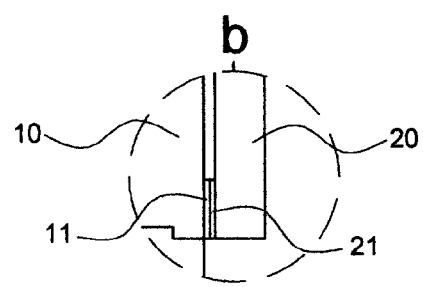

Here, as shown in FIG. 4, the auxiliary lens 20 has the magnetically transparent film 23 entirely or partially formed on the other surface which is attached to the main lens 10, namely, the front surface of the auxiliary lens 20, so that the pattern layer 25 of which the magnetically transparent film 27 is entirely or partially formed on one side is attached to the magnetically transparent film 23.

Figure 3:
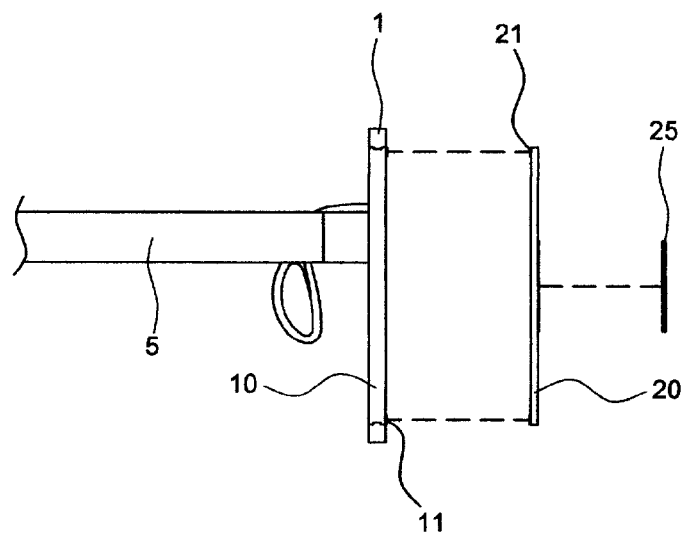
FIG. 3 is a side view showing the eyeglasses according to the preferred embodiment of the present invention.
Figure 3:
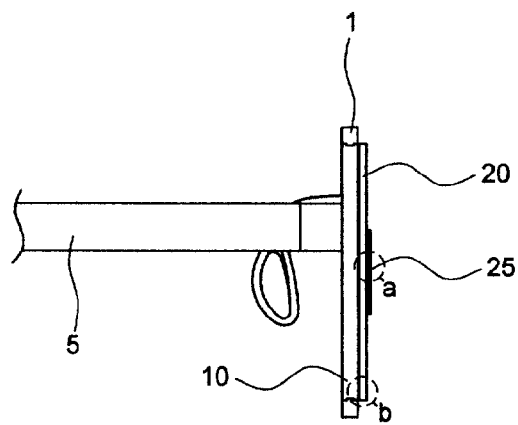
Figure 5:
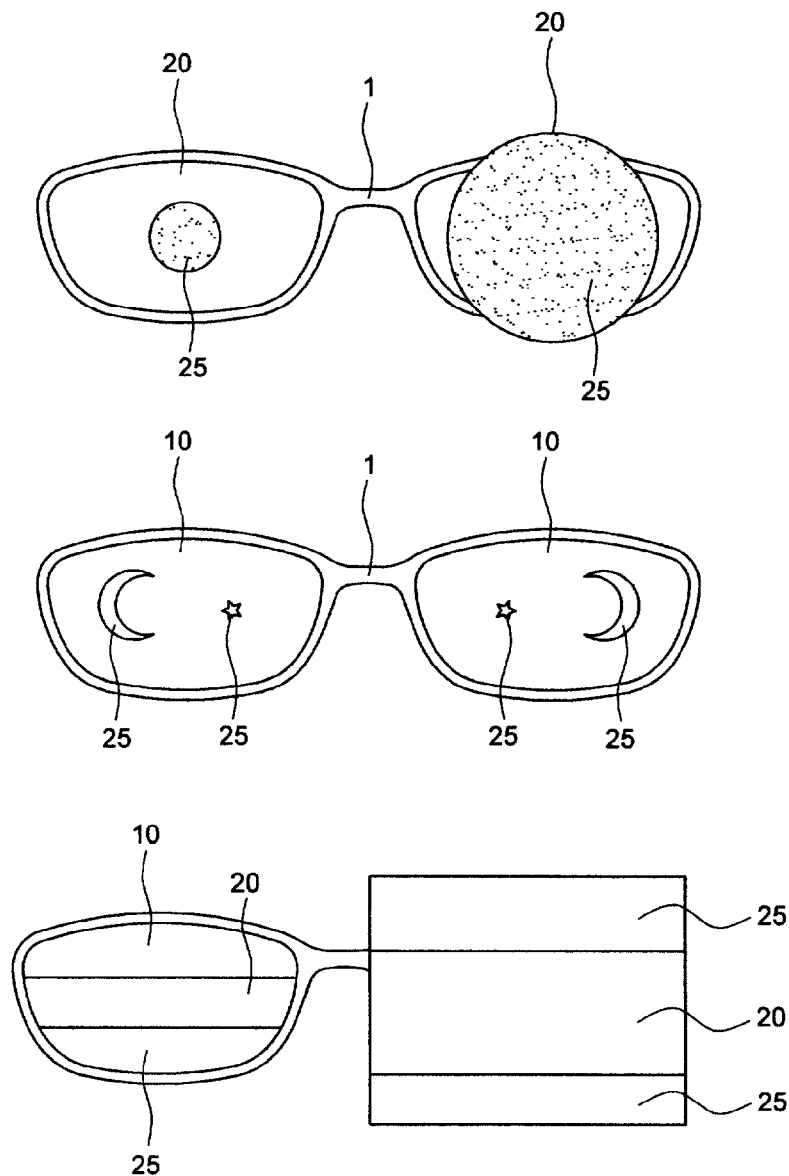
FIG. 5 is a view showing the eyeglasses according to the preferred embodiment of the present invention.

The pattern layer 25 is a core element of the present invention, and as shown in FIGS. 3 to 5, various images with various colors and forms may be entirely or partially attached to or detached from the magnetically transparent films 11 and 23 formed on the front surface of the main lens 10 or the auxiliary lens 20.

The pattern layer 25 may be formed in various ways, and in general, is formed on the front surface from the view of a wearer to be shown well. When the pattern layer 25 is formed transparently or formed to have various colors, it may make colors seen by the wearer's sight and real colors look different from each other or look the same. If the pattern layers 25 with different patterns or colors are applied to the right and left lenses, the wearer cannot feel the difference but viewers can feel the difference between the left lens and the right lens.

Moreover, when the pattern layers 25 are attached to the main lenses 10 or the auxiliary lenses 20, the pattern layers 25 having different shapes may be applied to the left lens and the right lens so as for the wearer to express his or her individuality and mood according to situations.

For instance, different pattern layers 25 may be selectively attached to the main lenses 10 or the auxiliary lenses 20 according to the wearer's needs and situations. Alternatively, the pattern layers 25 may have figures or images related with cultural life, political expressions, and matters difficult to express linguistically so as for the wearer to express his or her intention.

Therefore, the wearer can express his or her intention to random people about matters difficult to easily express linguistically when he or she attends an important event, and easily show and express situations or self-expression in various ways just by attaching and detaching the pattern layers.

Furthermore, for another example, people prepare placards with a logo of a team that he or she supports at a concert or in a soccer game in order to cheer the team. In this instance, if the pattern layers 25 have the logo of the team that the wearer supports and the wearer applies the pattern layers to the main lenses 10 or the auxiliary lenses and wears the eyeglasses, the wearer can use the eyeglasses as a cheering tool without using additional cheering tools, such as placards, just by replacing the pattern layers 25.

In the present invention, the pattern layers 25 may have a round shape with various images, various pattern shapes, or various flag images of many countries.

In the meantime, because the pattern layers 25 may be selectively attached to or detached from any positions of the surfaces of the main lenses 10 or the auxiliary lenses 20, the wearer can promptly cope with his or her situations or events.

Additionally, as shown in FIG. 5, the wearer can selectively apply colors to the pattern layers 25 the wearer wants to express and wear the main lenses 10 or the auxiliary lenses 20 to which the pattern layers are attached in order to express an image that he or she wants. Through the above process, the wearer can express flags of various countries, such as France, Turkey, Holland, Vietnam, Japan, and others.

For instance, the flag of Japan has a background with white color and a round core with red color, and the flag of Vietnam has a background with red color and a star shape with yellow color. In order to express such flags, the main lenses 10 or the auxiliary lenses have white color or red color and the pattern layers 25 have red color or yellow color.

Figure 6:
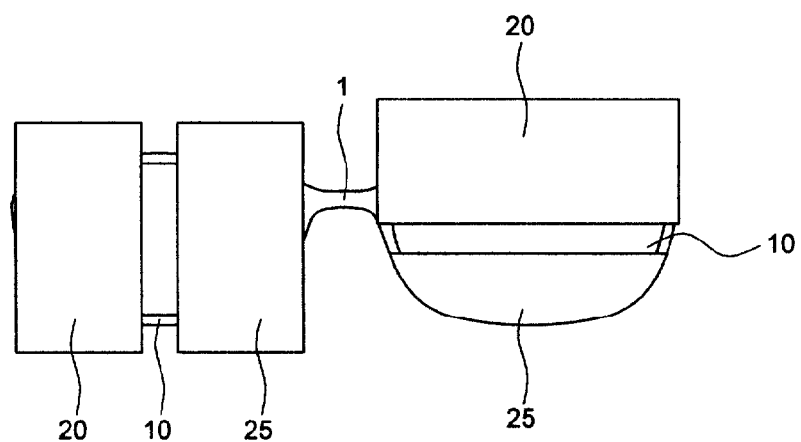
FIG. 6 is a view showing eyeglasses according to another preferred embodiment of the present invention.
Figure 6:
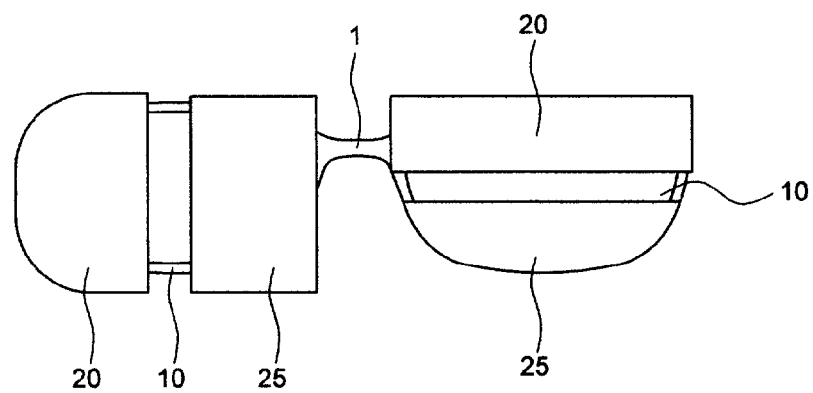
Figure 11:
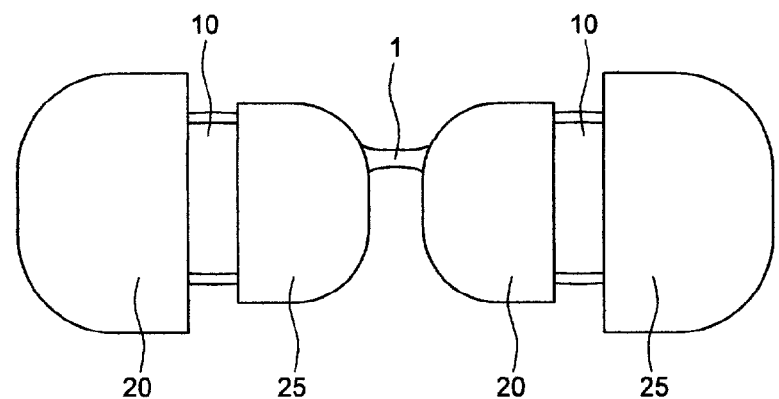
FIG. 11 is a view showing eyeglasses according to the another preferred embodiment of the present invention.
Figure 11:
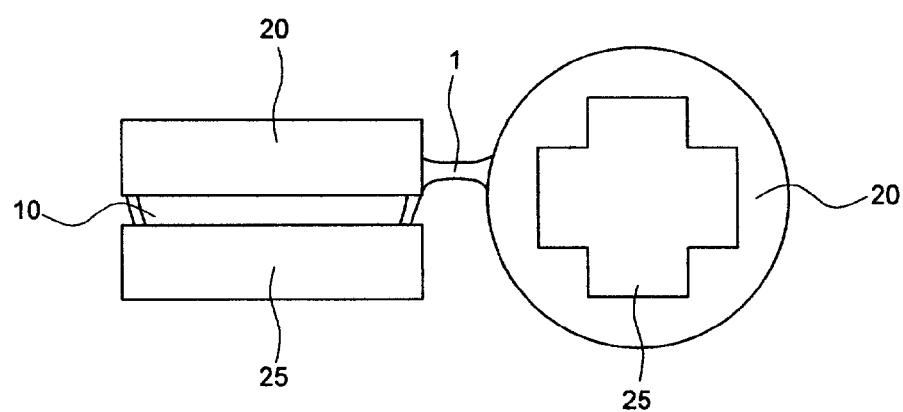

Meanwhile, as shown in FIGS. 5, 6 and 11, because the flag of France is a tricolor flag with blue color, white color and red color, the main lenses 10, the auxiliary lenses 20 and the pattern layers 25 respectively have blue color, white color and red color to express the flag of France. Because the flag of Turkey has a background with red color and a crescent moon and a star with white color, the main lens 10, the auxiliary lens 20 and the pattern layers 25 are respectively used to express the colors or one of the main lens 10 and the auxiliary lens 20 is used and the pattern layers 25 have a crescent moon and a star. Because the flag of Holland has red color, white color and blue color, the red color, the white color and the blue color are respectively expressed on the main lens 10, the auxiliary lens 20 and the pattern layer 25 in order to express the flag of Holland.

Figure 10:
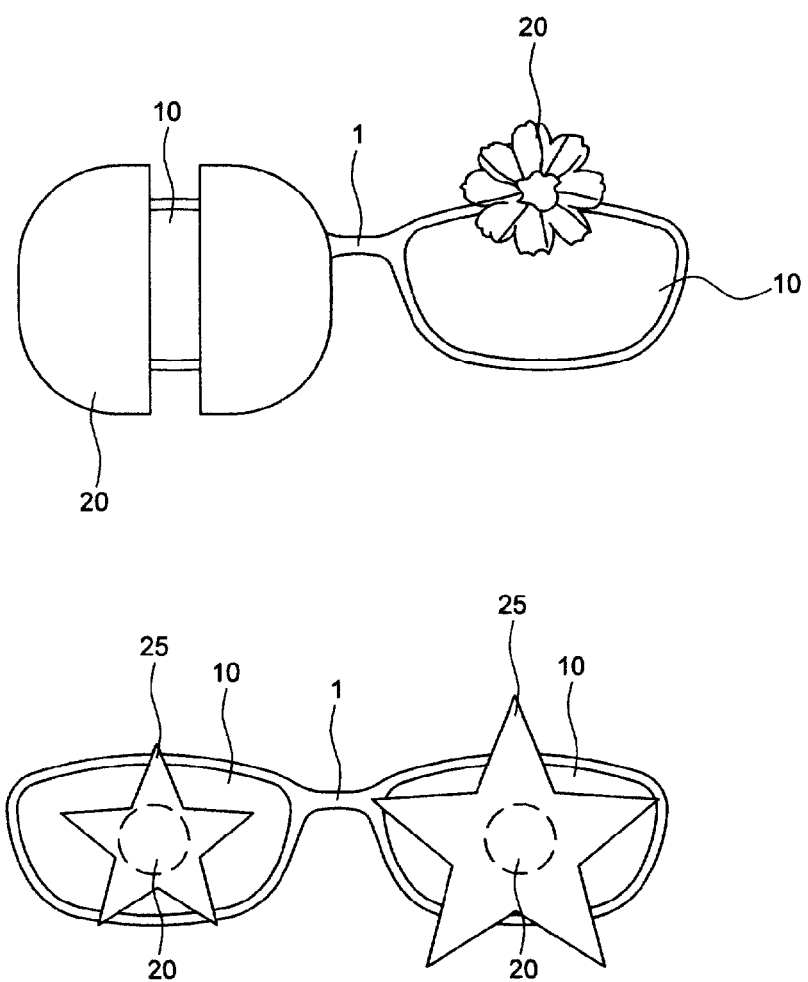
FIG. 10 is a view showing eyeglasses according to the another preferred embodiment of the present invention.

Moreover, as shown in FIG. 10 or 11, colors of the flags of various countries all over the world may be freely modified and expressed using the main lenses 10, the auxiliary lenses 20 and the pattern layers 25, and Christians may use the pattern layers of a cross shape, Buddhists may use the pattern layers of a lotus shape, and Moslems may use the pattern layers of a crescent shape.

Figure 7:
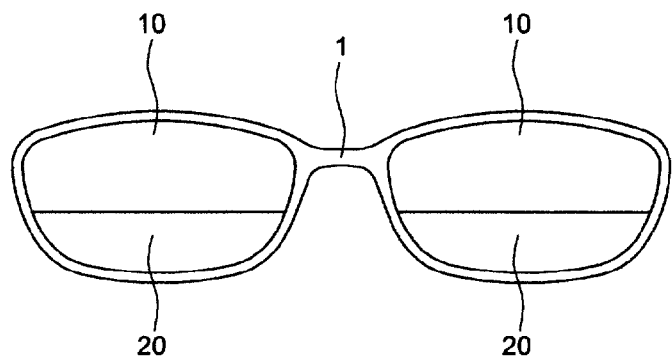
FIG. 7 is a view showing eyeglasses according to the another preferred embodiment of the present invention.
Figure 7:
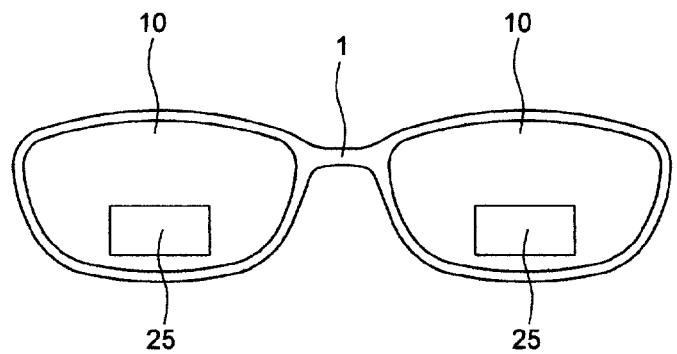
Figure 9:
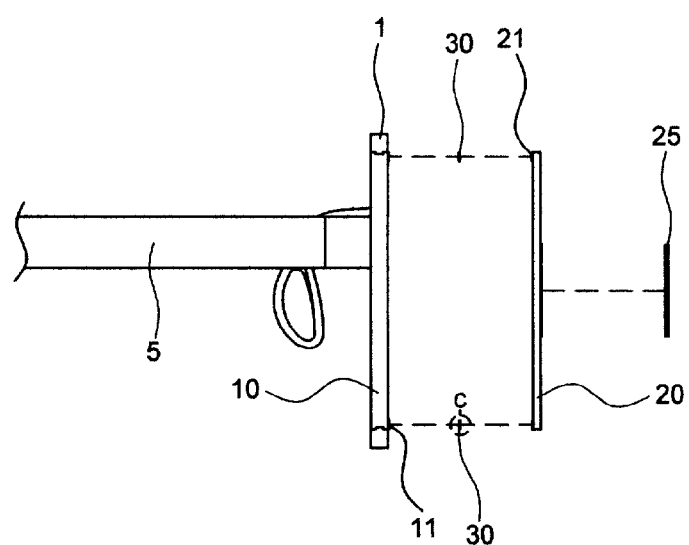
FIG. 9 is a view showing eyeglasses according to another preferred embodiment of the present invention.
Figure 9:
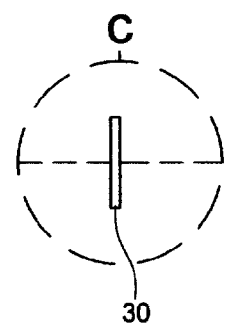

Furthermore, as shown in FIG. 7 or 9, the auxiliary lens 20 is smaller or larger than the main lens 10 and selectively has the power of eyeglass (reading glasses) so that the wearer can use the eyeglasses according to use purposes when he or she reads a dictionary or small letters.

For instance, assuming that the main lenses 10 have weak power and the auxiliary lenses 20 or the pattern layers 30 have the power of eyeglass, if the wearer wears the eyeglasses after attaching the auxiliary lenses 20 to the front surfaces of the main lenses 10, it is of help to the wearer when the wearer reads a dictionary or small letters, but it sometimes causes dizziness or headache by shaky eyesight due to stronger power of eyeglass that the power of the main lenses 10 and the power of the auxiliary lenses 20 are summed up because the wearer makes his or her eye focus face downwards when going down stairs. So, the wearer may lose his or her footing, and it may cause accidents.

However, in the present invention, assuming that the main lenses 10 do not have the power for the purpose of fashion, the auxiliary lenses 20 or the pattern layers 25 have the power and are formed to be smaller or larger than the main lenses 10, so that the wearer can selectively attach and detach the auxiliary lenses or the pattern layers according to use purposes.

In other words, the auxiliary lenses 20 or the pattern layers 25 are not disposed on the whole surfaces of the main lenses 10 but may be formed to have the power just in the direction of the wearer's eye focus, namely, in the direction that the wearer is looking, and to be a fifth or a third smaller than the main lenses 10. In case that the auxiliary lenses 20 or the pattern layers 25 having the power (reading glasses) are attached to the main lenses 10, they are detached from the main lenses 10 to secure safety without the wearer' shaky eyesight when the wearer does down the stairs.

Figure 8:
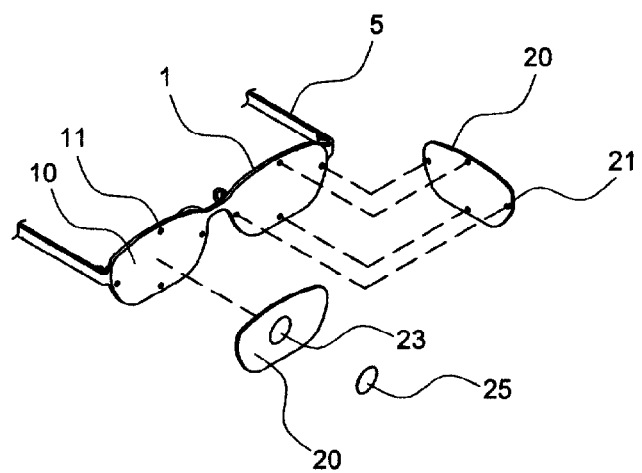
FIG. 8 is a view showing eyeglasses according to the another preferred embodiment of the present invention.

Additionally, as shown in FIG. 8, the magnetically transparent films 11 of the main lenses 10 are entirely or partially formed on the surfaces corresponding to the auxiliary lenses 20, and the pattern layers 25 are selectively attached to and detached from the magnetically transparent films 11.

That is, it is possible that the magnetically transparent films 11 be entirely or partially formed on the front surfaces of the main lenses 10 except the rims of the main lenses 10 and the pattern layers 25 be selectively attached to the magnetically transparent films 11 of the main lenses 10 without the auxiliary lenses 20.

In addition, in case that the magnetically transparent films 11 are partially formed on the front surfaces of the main lenses 10, as shown in FIG. 8, the magnetically transparent films 11 are formed on the rims of the front surfaces of the main lenses 10, and in detail, four magnetically transparent films 11 are respectively formed at an upper portion, a lower portion, a left side and a right side. The auxiliary lenses 20 have magnetically transparent films 21 at positions corresponding to the magnetically transparent films 11 of the main lenses 10, so that the auxiliary lenses 20 are respectively attached to the main lenses 10. Therefore, as shown in FIG. 4, a space is formed between the main lens 10 and the auxiliary lens 20 without the facing surfaces of the main lens 10 and the auxiliary lens 20 touching each other so as to prevent a damage due to friction between the main lens 10 and the auxiliary lens 20.

Moreover, not shown in the drawings, the auxiliary lenses 20 may have magnetically transparent films 21 partially formed like the main lens 10.

In the meantime, as shown in FIG. 9, a support 30 made of a material attached by magnetism or a magnetic material is disposed at a portion corresponding to the magnetically transparent films 11 and 21 between the main lens 10 and the auxiliary lens 20 so that the corresponding surfaces of the main lens 10 and the auxiliary lens 20 do not touch each other. The support 30 has magnetic forces at both sides, and may have an elastic body, such as a sponge, at a central portion thereof, but the present invention is not restricted to the above.

Furthermore, not shown in the drawings, it is also possible that the magnetically transparent films 11 and 21 be buried in the main lens 10 and the auxiliary lens 20 without being applied to the surfaces of the main lens 10 and the auxiliary lens 20.

Additionally, not shown in the drawings, recently, outer sides of the main lens 10 and the auxiliary lens 20 are rounded, namely, curved. In this instance, the support 30 is also curved corresponding to the main lens 10 and the auxiliary lens 20 in order to maximize an area that both sides of the support 30 meet the main lens 10 and the auxiliary lens 20.

In addition, the support 30 can prevent scratches or friction between the main lens 10 and the auxiliary lens 20. Moreover, very few wearers who wear eyeglasses have the same eyesight in right and left eyes. So, because most of wearers wear eyeglasses having right and left lenses with different thicknesses, a heavier part of the eyeglasses may droop or be twisted due to weight imbalance of the eyeglasses.

In this instance, the support 30 keeps weight balance between the right and left lenses to overcome a difference in weight between the lenses so that the wearer can feel stability while wearing the eyeglasses.

In other words, in case that any one of the lenses of the eyeglasses is thicker or larger or the pattern layers 25 are attached to any one of the lenses, one or more supports 30 or supports 30 with different weights may be disposed to adjust weight balance so that the other one which is thinner or to which the pattern layers 25 are not attached can adjust weight balance.

Figure 12:
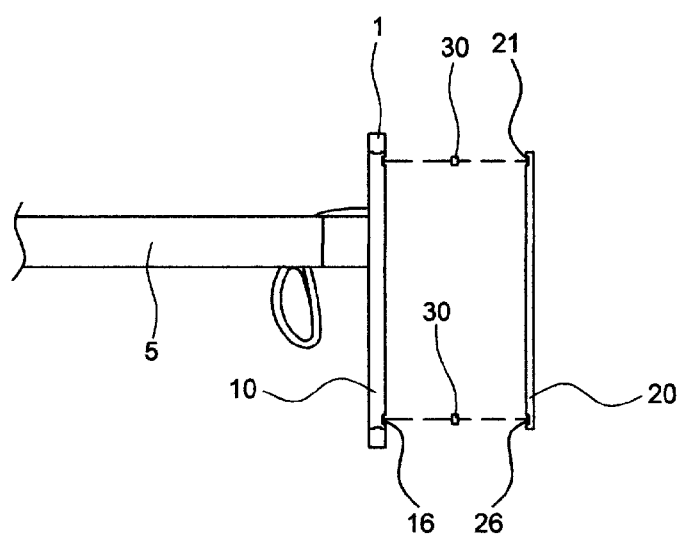
FIG. 12 is a view showing a main lens, an auxiliary lens and a support of the eyeglasses according to another preferred embodiment of the present invention.
Figure 13:
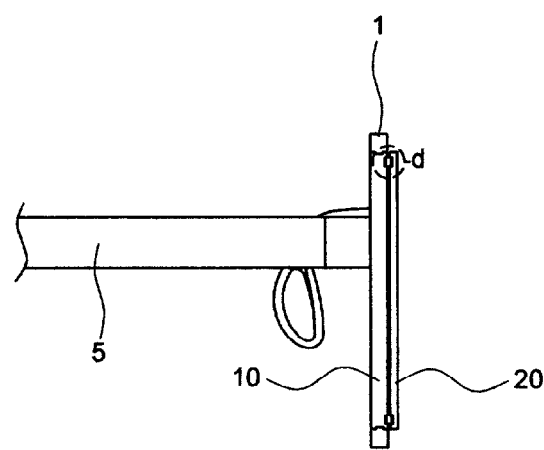
FIG. 13 is a view showing a main lens, an auxiliary lens and a support of the eyeglasses according to the another preferred embodiment of the present invention.
Figure 13:
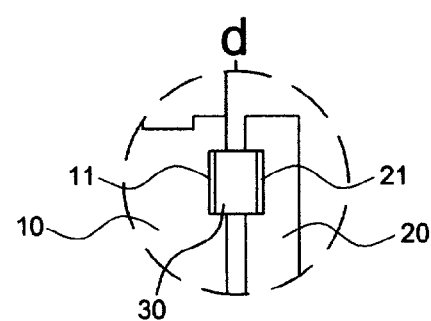

Meanwhile, as shown in FIG. 12 or 13, the main lenses 10 and the auxiliary lenses 20 have a plurality of recesses 16 and 26 formed at corresponding portions to be spaced apart from each other at regular intervals. The width of the support 30 is larger than the sum of the widths of the recesses 16 and 26, and preferably, is twice the sum of the widths of the recesses 16 and 26. As shown in FIG. 13, the number of the supports 30 corresponds to the number of the recesses 16 and 26, and one side of each support 30 is inserted into the recess 16 and the other side of each support 30 is inserted into the recess 26.

In case of the above structure, because the supports 30 are fastened, it can prevent the main lens 10 and the auxiliary lens 20 from being separated so that the eyeglasses can secure stability from shock due to firm fixation power.

Figure 14:
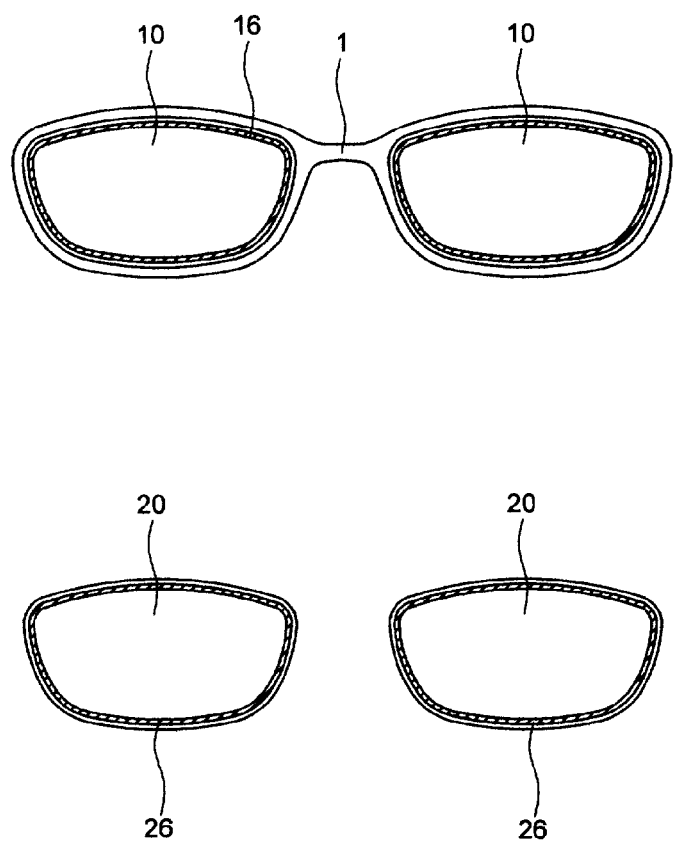
FIG. 14 is a view showing a main lens and an auxiliary lens according to another preferred embodiment of the present invention.

Furthermore, as shown in FIG. 14, the recesses 16 and 26 are formed in a recess shape, but may be formed in a groove shape continuously extending at the corresponding portions of the main lens 10 and the auxiliary lens 20 and the supports 30 are formed corresponding to the grooves. That is, the present invention is not restricted to the above embodiment.

As described above, the eyeglasses having a selectively detachable pattern layer according to the embodiment of the present invention can allow wearers to selectively attach and detach the pattern layers with various forms to and from the outer surfaces of the main lenses or auxiliary lenses according to the current situations so that the wearers can show their own expressions and individualities and quickly cope with their situations, thereby providing convenience and diversity in use and causing curiosity and interest of viewers. In the case that the wearer attaches the pattern layers or the auxiliary lenses having the power of eyeglass to the main lenses, when the wearer goes down the stairs or the eye focus of the wearer looks down, the wearer can detach the auxiliary lenses and the pattern layers from the main lenses to prevent shaky eyes and secure stability.

Additionally, the eyeglasses having a selectively detachable pattern layer according to the embodiment of the present invention can prevent a damage of the main lenses or the auxiliary lenses since the corresponding portions of the main lenses and the auxiliary lenses do not touch each other when the auxiliary lenses and the pattern layers are attached to the main lenses.

The invention claimed is:

1. Eyeglasses having a selectively detachable pattern layer comprising: main lenses (10) mounted on a glass frame (1); auxiliary lenses (20) attached to the main lenses (10); and magnetically transparent films (11, 21) or buried magnets formed on the corresponding surfaces of the main lenses (10) and the auxiliary lenses (20) so that the auxiliary lenses (20) are detachably attached to the main lenses (10),
   wherein the magnetically transparent film (11) or the buried magnet of each main lens (10) is entirely or partially formed on the main lens (10) and two or more magnetically transparent films (11) are formed on the rim of the front surface of the main lens to be spaced apart from each other when the magnetically transparent film (11) is formed partially, and
   wherein the auxiliary lens (20) includes: a magnetically transparent film (21) formed to correspond to the magnetically transparent film (11); a magnetically transparent film (23) entirely or partially formed on the other surface of the auxiliary lens (20) on which the magnetically transparent film (21) is coated so that the magnetically transparent films generally have various colors and are formed smaller or larger than the auxiliary lens (20); a magnetically transparent film (27) formed on the whole surface of one side thereof; and a pattern layer (25) selectively attached to or detached from the magnetically transparent film (11) or the magnetically transparent film (23).

2. The eyeglasses according to claim 1, wherein one or more pattern layers (25) are formed, and the plurality of the pattern layers 25 have the same image or different images, and
   wherein the magnetically transparent films (11, 21) have thickness that the corresponding surfaces of the main lens (10) and the auxiliary lens (20) do not touch each other.

3. The eyeglasses according to claim 1, wherein a support (30) made of a material attached by magnetism or a magnetic material is disposed at a portion corresponding to the magnetically transparent films (11, 21) among the main lens (10), the auxiliary lens (20) and the pattern layer (25) so that the corresponding surfaces of the main lens (10) and the auxiliary lens (20) do not directly touch each other.

4. The eyeglasses according to claim 1, wherein the auxiliary lens (20) and the pattern layer (30) are smaller or larger than the main lens (10) and selectively have the power of eyeglass.

5. The eyeglasses according to claim 1, wherein the eyeglasses have a round frame or a half frame.

* * * * *